Aug. 29, 1967  KUNIO HASHIMOTO  3,338,383
PIPE CONVEYOR
Filed Sept. 21, 1965                                        5 Sheets-Sheet 1
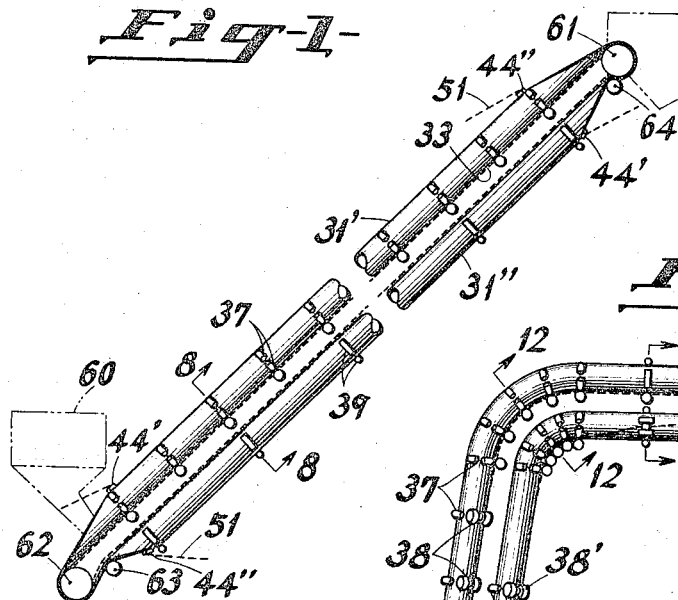
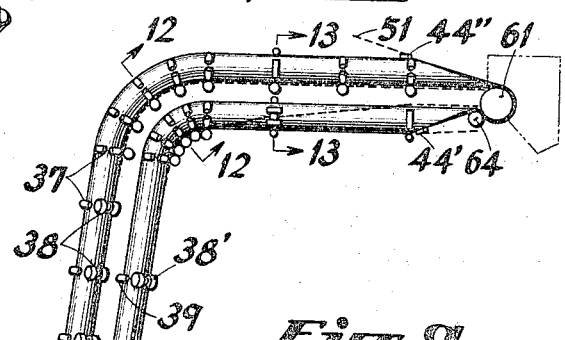
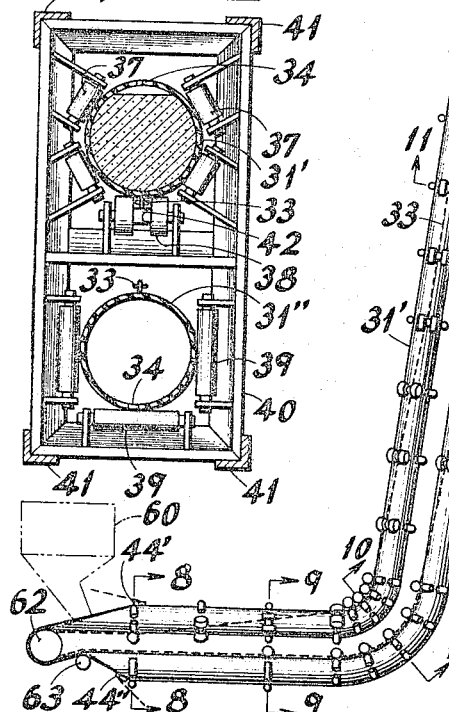
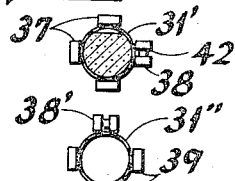
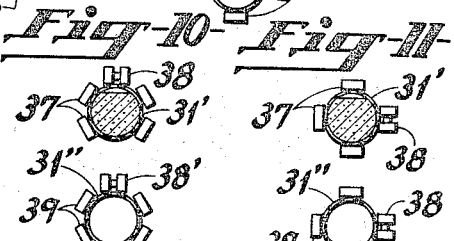
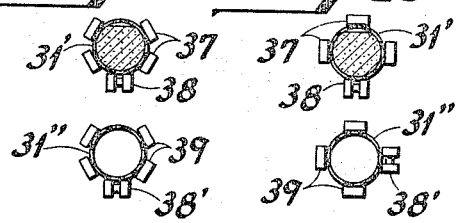
INVENTOR.
KUNIO HASHIMOTO

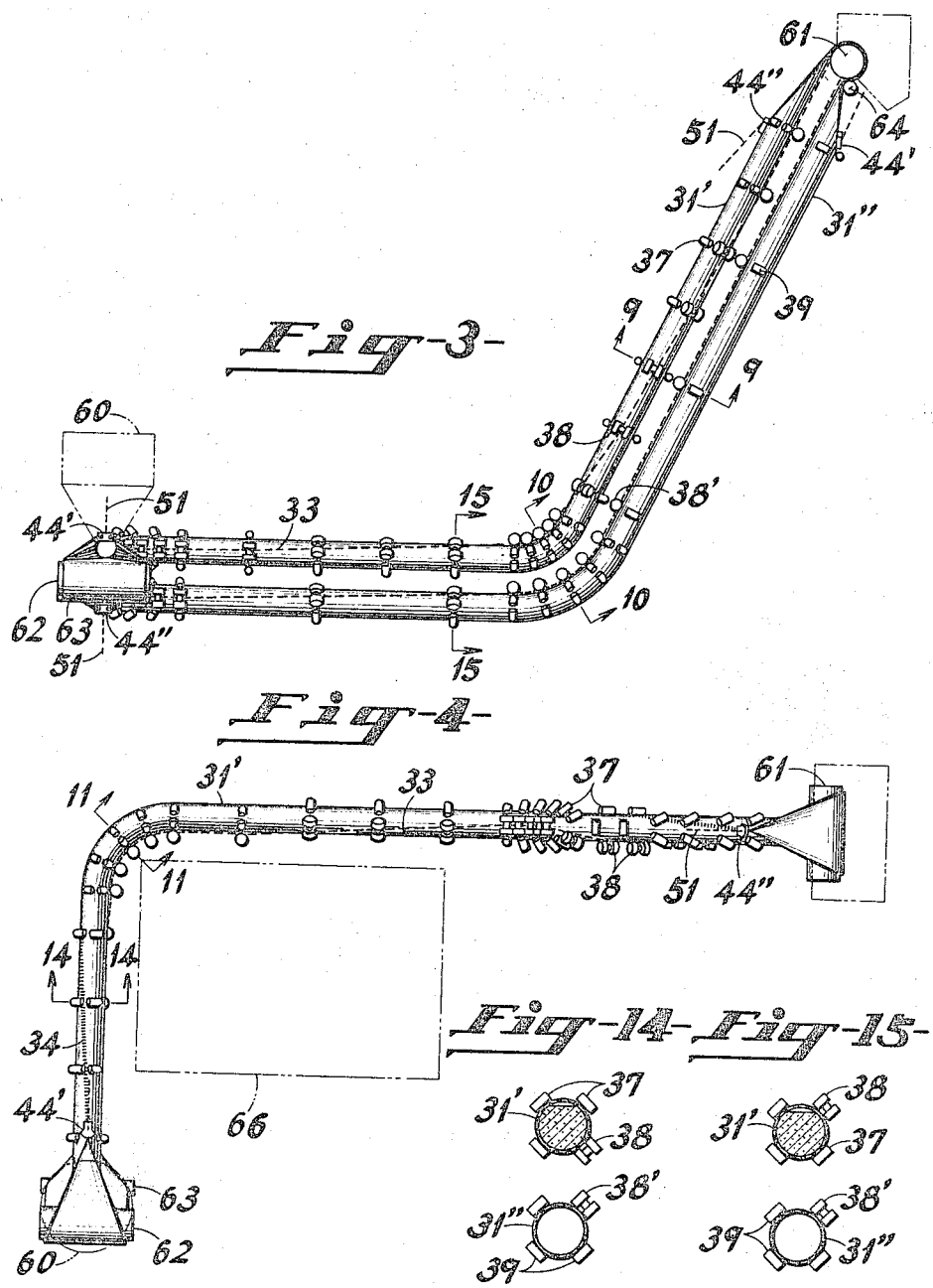

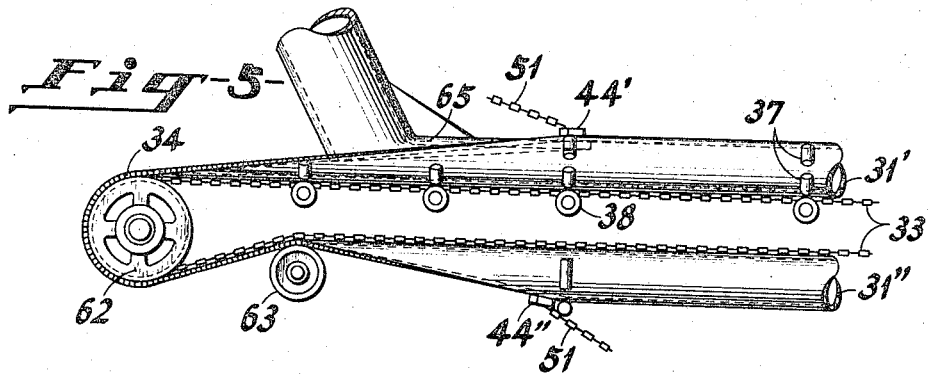
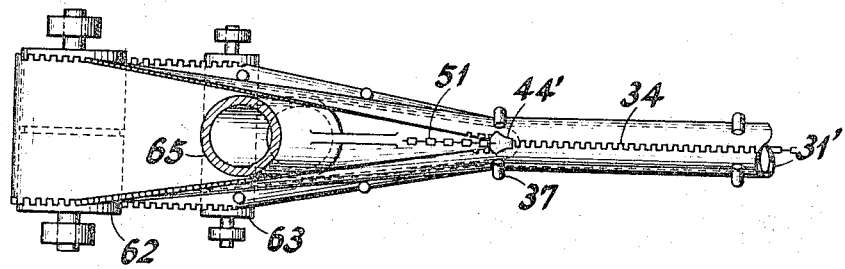
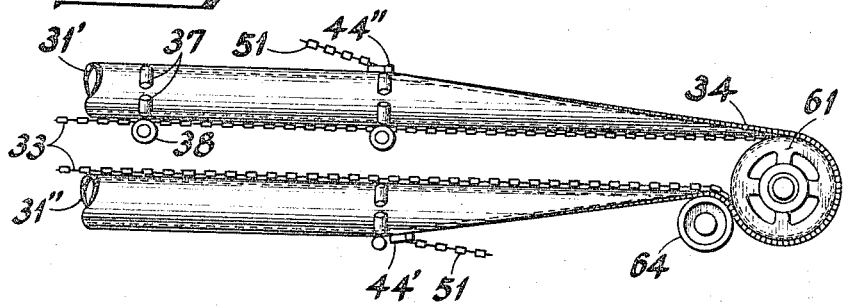

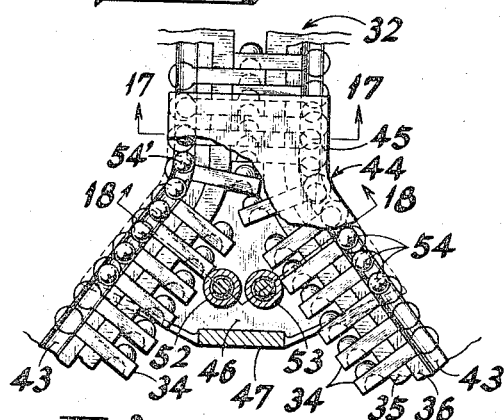
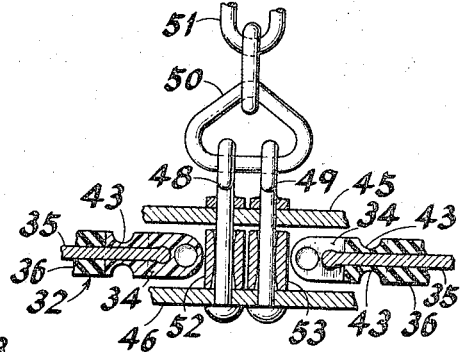
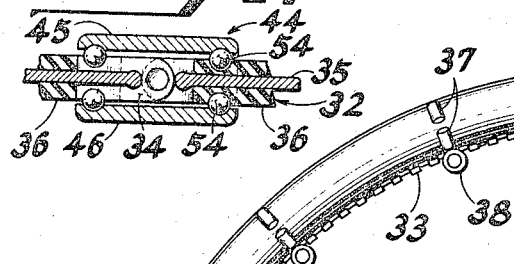
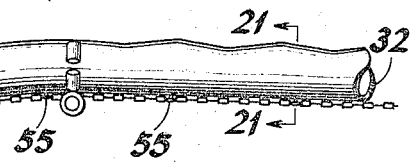
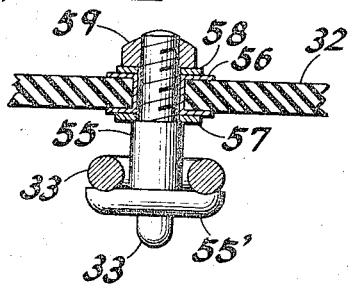
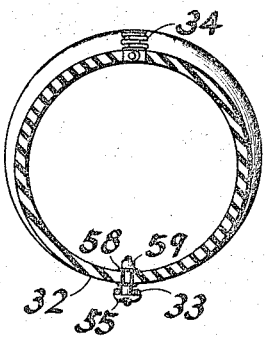

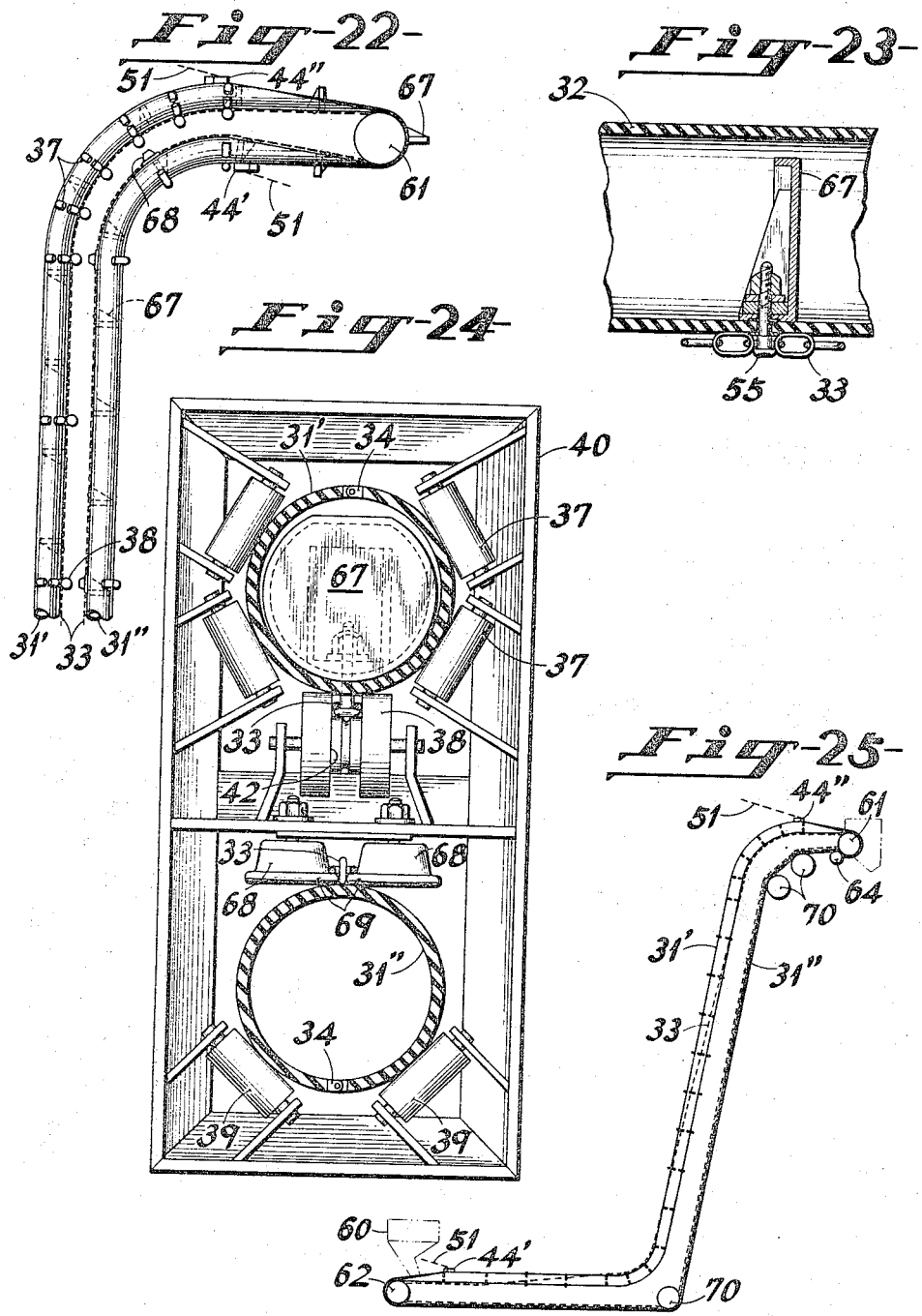

United States Patent Office 3,338,383
Patented Aug. 29, 1967

3,338,383
PIPE CONVEYOR
Kunio Hashimoto, 1566 Nishi O-izumi, Nerima-ku, Tokyo, Japan
Filed Sept. 21, 1965, Ser. No. 489,028
7 Claims. (Cl. 198—204)

This invention relates to material handling and more particularly to an improved method and apparatus for conveying and elevating bulk material completely enclosed within a conveying medium.

Where it is desired to move material in a continuously moving conveying medium, a belt conveyor is often selected. Belt conveyors are generally laid out horizontally. In most cases, the carrier rollers of belt conveyor are mounted to form a trough in the belt, so that the conveyor capacity is increased. The troughed belt conveyor can be operated at an inclined long path without slippage of material. For steeper angles of inclination, cleats may be mounted across the belt to prevent the slide back of the material during rise or descent.

Conventional belt conveyors cannot, however, be used for curved horizontal travel as well as twist. Maximum slope angles of belt conveyors are determined by the conditions of material handled, but conventional belt conveyors cannot be used, even if they are troughed, at an incline steeper than 30 degrees. It is absolutely necessary to prevent surges that would spill over the edges of the belt. Conventional belt conveyors are not suitable to handle such material which are to be protected from wind or dust.

Above-mentioned disadvantages in the conventional belt conveyors may be eliminated by closing the belt to form a moving pipe line.

The possibility of the provision of a moving pipe line for bulk material has been demonstrated by an American company. This is called "Zipper Conveyor-Elevator" and it consists of a flat endless base belt, flexible rubber side walls hinged to the shoulders of the base belt and interlocking rubber teeth molded on the outer edges of the side walls. Such conveyor-elevator, however, has the drawback that it is difficult to mold the fairly stiff rubber teeth on the flexible side walls. The side walls and their hinged portions are easily yieldable and tear rather soon by the repetition of stress cycles of the closing and opening operation of the belt. For a horizontal straight run, the zipper conveyor-elevator moves on carrier rollers similar to usual belt conveyor, but when it is curved horizontally or vertically the loaded belt is supported by the so-called bend rollers which engage to the edges of the base belt. Accordingly, the base belt must be of a material of high rigidity to withstand the load. The more rigidity the belt has, the less flexible the conveyor will be. Thus, the bend radius of the zipper conveyor-elevator will be relatively large. Moreover the loaded zipper conveyor-elevator is driven by the tension of the base belt itself, so that the belt is required to have considerably high tensile strength. Since the loaded conveyor runs on the carrier rollers similar to the usual belt conveyor, the carrier rollers must be of heavy duty to withstand the load.

The present invention possesses all of the advantages of the prior art and none of the foregoing disadvantages. According to the present invention, an endless flexible belt is automatically closed, after the loading of material, to form an endless flexible pipe of substantially circular cross section and is driven by means of a link chain which is fixed to the belt over all the length thereof. This conveyor pipe is, therefore, moved in such manner that it is mounted on a moving link chain. Thus, the force to drive the conveyor will not act directly on the belt. It means that the belt may be of a thin material, thus good flexibility will be obtained when the belt is closed to form a pipe. Such a flexible pipe can curve by small radius in any direction, horizontally or vertically. The loaded conveyor pipe of the invention is supported, when it travels from place to place, by several carrier rollers which are arranged to form substantially a circle. Since the conveyor pipe of the invention has substantially a circular cross section, the load will not be borne by one point or one plane but it will be dispersed in every direction with respect to the cross section thereof. Thus, three or four light-duty rollers will be enough to serve as the carrier rollers by the provision that they engage to the outer wall surface of the pipe at regular intervals.

The above and other features of the invention are more specifically referred to in the description hereinafter contained which, taken in conjunction with the accompanying drawings, discloses preferred forms of the pipe conveyor constructed to operate in accordance with the invention.

In the drawings:

FIGS. 1 to 3 show a few typical arrangements of a conveyor of the invention, with structural steel supports and framework omitted;

FIG. 4 is a plan view of FIG. 3;

FIG. 5 is a fragmentary sectional view, to a larger scale taken through a loading spout appropriate for use in the illustrated embodiments of the invention;

FIG. 6 is a plan view of FIG. 5;

FIG. 7 is an enlarged side view, with certain parts cut away, of the discharge point of the conveyor shown in FIGS. 1 to 4;

FIG. 8 is an enlarged transverse section taken on line 8—8 of FIGS. 1 to 4, showing the means for holding the conveyor in a pipe-like form;

FIGS. 9 to 11 are diagrammatical sectional views taken on lines 9—9, 10—10 and 11—11, respectively, of FIGS. 2 to 4, with their framework removed, showing the manner for twisting the conveyor pipe of the invention;

FIGS. 12 and 13 are diagrammatical sectional views, similar to FIGS. 9 to 11, taken on lines 12—12 and 13—13 of FIG. 2;

FIGS. 14 and 15 are diagrammatical sectional views, taken on lines 14—14 and 15—15, respectively, of FIGS. 3 and 4;

FIG. 16 is a detailed plan view, with certain parts cut away, of a fastener mechanism appropriate for use in the illustrated embodiments of the invention;

FIGS. 17 and 18 are transverse sectional views taken on lines 17—17 and 18—18, respectively, of FIG. 16.

FIG. 19 is a fragmentary sectional view illustrating the method of connecting the link chain to the endless flexible belt;

FIG. 20 is a fragmentary side elevation of a modification of the conveyor pipe according to the invention;

FIG. 21 is an enlarged transverse section taken on line 21—21 of FIG. 20;

FIG. 22 is a fragmentary side elevation of a further modification of the conveyor pipe;

FIG. 23 is a detailed sectional view illustrating the method of connecting a partition wall to the conveyor pipe of FIG. 22;

FIG. 24 is an enlarged transverse section taken on line 24—24 of FIG. 22, showing the means for supporting and guiding the conveyor pipe at a curved travel; and FIG. 25 shows a still further modification of the conveyor arrangement of the invention.

The conveyor pipe of the present invention is indicated generally by numerical reference 31 and it has three main elements, the endless flexible belt 32, link chain 33 and normally spaced teeth 34. The endless belt 32 consists of a carcass 35 and covers 36 similar to the usual conveyor belting. The carcass 35 supplies the tensile strength and the body to hold the shape. The covers 36 protect the carcass 35 from abrasion and exposure. The carcass 35 is made up of layers of cotton, rayon, nylon, etc. impregnated with resilient rubber. The link chain 33 is connected to the center of the back face of the belt 32 overall the length thereof. The normally spaced teeth 34 on both sides of the belt 32 can mesh and interlock to form an endless flexible pipe, or the conveyor pipe 31, as shown.

In order to hold and support the conveyor pipe 31 in a pipe of circular cross section, the carrier rollers in the present invention are arranged to form a circle in which the conveyor pipe 31 is supported as shown especially in FIGS. 8 to 13 and 22. The conveying or carrying run 31' of the conveyor pipe of the invention is carried by the carrier rollers 37 and 38. The return run 31" of an empty pipe is also carried by several rollers or return rollers 39, 39. The rollers 37, 38 and 39 are rotatably mounted on a frame member 40, respectively. The frame members 40, 40 with the rollers 37, 38 and 39 are arranged at a regular interval along the traveling path of the conveyor pipe 31. The frame members 40, 40 may be interconnected by stringers 41, 41. One of the carrier rollers, i.e. the carrier roller 38 is provided at the center thereof with a circumferential groove 42 which receives and guides the link chain 33.

Any suitable closure device may be used as the fastener means to interlock the normally spaced teeth 34 on both sides of the belt 32, but in the typical embodiments of the invention a slide fastener device is applied to the belt 32. As shown in FIGS. 16 to 18, the normally spaced teeth 34 are fixedly secured to the edges of the carcass 35, and their fixed ends are covered by the rubber covers 36. It is to be noted that a groove 43 is provided at the portion where the teeth 34 are fixed to the belt 32. This groove 43 extends over all the length of the belt 32 on both side portions and on the upper and lower faces of the belt in parallel.

A slider 44 acts to engage and disengage the normally spaced teeth 34 on both sides of the belt 32. In a preferred form of embodiment, the slider 44 consists of an upper wall 45 and lower wall 46 which are arranged parallel and are internally connected by a vertical wall 47 at their lower end in FIG. 16. The upper wall 45 and lower wall 46 are further connected to each other by two vertical shafts 48 and 49. The shafts 48 and 49 supply, together with the vertical wall 47, the strength to hold the shape of the slider 44; and these shafts are connected to a ring 50 which serves to pull the slider 44 by means of a chain 51 toward the direction counter to the run of the belt 32 in operation. Small rollers 52 and 53 are rotatably mounted to the shafts 48 and 49, respectively, and are adapted to contact with the tip ends of the teeth 34.

The upper wall 45 of the slider 44 is provided at both sides thereof with a pair of curved rows of balls 54, 54. Each row of the balls 54, 54 is bent at its middle point 54' in FIG. 16, i.e. the ball-row of the upper half from the middle 54' is laid in parallel each other while the row of the lower half from the middle 54' is directed toward the positions for increasing the relative distance of this pair of rows of the balls 54, 54. A pair of similarly arranged rows of balls 54, 54 is provided on both sides of the lower wall 46 of the slider 44, in such manner that the edge portions of the belt 32 are sandwiched by the parallel rows of the balls 54, 54 on the upper and lower walls of the slider 44. Thus, the belt edge will be forced to curve in the same plane when the groove 43 has received and engaged with the curved row of the balls 54, 54. In travelling through the slider 44, the spaces between the teeth 34 are spread and the teeth mesh without rubbing contact. As the teeth pass the middle point 54', they lock firmly. Then, the belt 32 is securely closed for conveying.

In reverse manner the belt 32 is automatically opened.

As previously described, the conveyor pipe 31 of the invention is driven by the link chain 33. The form or type of the link chain 33 is not critical, but an open link chain or oval link chain is preferably used for its adaptability to a lateral oscillation which may occur during the travel of the conveyor pipe. In the illustrated embodiments of the invention, a bolt 55 is pierced through the wall of the belt 32, as shown in FIG. 19. The hole for piercing the bolt 55 must be reinforced with an eyelet ring 56. The head 55' of the bolt 55 has enough width to support or secure one link of the chain 33 as shown. When the bolt 55 with the link chain 33 is fixed to the belt 32, two washers 57 and 58 are used to hold the eyelet ring 56 therebetween, then a nut 59 is screwed unto the bolt 55. Thus, a firm connection between the belt 32 and link chain 33 will be established.

In operation the pipe conveyor of the invention can convey bulk material horizontally or on inclines in any direction and in any plane with a great variety of arrangements without transfer and with only one drive. FIG. 1 shows an arrangement for providing an inclined conveyor where materials are loaded in usual way by means of a hopper 60 and discharged over a head pulley 61. Reference numeral 62 indicates a take-up pulley; 63 denotes a tension pulley; and 64 is a pressure pulley. The hopper 60 has a loading shoe, or loading spout 65, the tip of which spout extends beneath the slider 44' (see FIGS. 5 and 6). The empty pipe of return run 31" is opened by the slider 44" and spread to pass around the take-up pulley 62.

The head pulley 61 is a chain wheel to drive the link chain 33. At the point of discharge, the slider 44" acts to disengage the teeth 34 on both sides of the belt 32 and spread the opened belt to pass around the head pulley 61 where the materials are discharged. The return run 31" of the conveyor is closed again by means of the slider 44' to form an empty pipe.

Suitable means for blowing a jet of air is provided before the slider 44' in order to clean the teeth 34.

FIG. 2 illustrates an arrangement which combines horizontal or inclined conveyor and elevator without transfer, and with only one drive. The discharge is over the head pulley 61 as shown. The conveying run 31' may be of considerable length, and the vertical run can be to any desirable height. By inverting the conveyor pipe 31 with 180-degree twists as shown, both of the conveying run 31' and return run 31" can move smoothly, because the tension link chain 33 always travels the inner path in each bend run.

FIGS. 3 and 4 illustrate an arrangement for conveying and elevating material in two planes. In this case, the conveying run 31' carries materials around horizontal bends of any degree to avoid an obstruction 66, with 90-degree twist at the point 11. After rounding the horizontal bend corner at the point 11, the carrying run 31' is further twisted 90 degrees at the point 10; then it travels to a second plane. In the second plane the loaded pipe of the carrying run 31' is elevated vertically or on inclines at any angle from the lower run. In order to discharge the carried materials over the head pulley 61, the loaded pipe of the carrying run 31' is inverted by twisting back to 180 degrees between the point 10 and the discharge point. The gradual twistings at the points 14 through 11, 15, 10 and 9 are required to avoid deformation of the conveyor pipe 31 at its bend corners, because the link chain 33 supplies tensile strength and it has a tendency to travel the shortest way when it curves.

The flexibility of this conveyor pipe can be increased by modifying the belt 32 to form a corrugated pipe. FIG. 20 is an example of the corrugated pipe and shows fragmentarily its travel at a bend corner. In view of the fact that the corrugated pipe is of so gentle pitch, there will be no trouble to the operation of the slider 44. To this end, the slider 44 is pulled by the chain 51 toward the direction counter to the run of the conveyor pipe in operation, so that the slider 44 follows the pitch of the corrugated pipe. Since the driving link chain 33 moves along the inner path when the conveyor pipe is curved, it is unnecessary to form the pipe to a completely corrugated one with respect to its cross section. Hence, as shown in FIGS. 20 and 21, the conveyor pipe may be of an anomalously corrugated pipe; that is to say the gentle wave is formed to the teeth-arranged portion only of the belt 32.

According to the invention the load is entirely enclosed within the belt 32. So, the load must travel with the belt even if the conveying run 31' is vertical. For a steeper angle of inclination or for a vertical run, suitable partition walls 67, 67 may be mounted within the conveyor pipe 31 of the invention. The bolt 55 which serves to connect the link chain 33 to the belt 32, may be used to fix the partition wall 67 as shown in FIGS. 22 to 24. Each partition wall bears the load of materials on inclines or vertical runs and transmits the load to the link chain 33. So that, the load of material will be divided in accordance with the number of provisions of the partition walls. It means that the material to form the belt 32 is not requested to be of so high tensile strength, since the conveyor pipe at the bend corner from the horizontal run to vertical run does not deform or break under the weight of all materials enclosed within the pipe of vertical run.

When the conveyor pipe of the invention, especially the loaded conveyor pipe, is carried around inside or outside bends for conveying or elevating material to any place or height, it is advisable to keep the drive chain 33 along the inner path by means of a 90-degree or 180-degree twist in said conveyor pipe as previously described. However, such twistings are not critical. FIG. 22 illustrates the manner to return the empty pipe of return run 31" without any twist. In this connection a pair of holding rollers 68 is arranged at the bend of the travel. The holding roller 68 has a flange 69 which engages between the link chain 33 and the pipe 31". As shown in FIG. 24, the return run 31" is suspended by a pair of holding rollers 68. In fact, the empty return run 31" is apt to sag when it has just passed over the head pulley 61. Therefore, the suspension of such empty pipe will not require so much power.

The return run 31" of the conveyor pipe of the invention is preferably closed to form an empty pipe to provide a dust tight pipeline. However, the return run 31" may be of a flat belt. FIG. 25 shows the arrangement of the conveyor forming a flat belt as the return run which is carried by several idler pulleys 70, 70.

Although preferred embodiments of the invention are herein disclosed for purposes of explanation, various modifications thereof, after study of this specification, will be apparent to those skilled in the art to which the invention pertains. Reference should accordingly be had to the appended claims in determining the scope of the invention.

What I claim is:

1. A conveyor particularly for transporting bulk material comprising an endless flexible belt having first and second side edges with spaced teeth extending along the length thereof, fixed anchoring means, a first slide fastener supported by and engaged with said belt and having means for directing said first and second side edges together to interengage the teeth of said edges and to form a closed conveying tube for the material to be conveyed, a first connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to close belt at its location on the belt as set by the length of said connection member, a second slide fastener engaged with said belt at a spaced location from said first slide fastener having means for directing said first and second side edges apart to disengage the teeth of said edges and to open the closed conveying tube to expose the material being conveyed, a second connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to open said belt at its location on the belt as set by the length of said connecting member, and means for guiding and driving said belt through a conveying path.

2. A conveyor according to claim 1, wherein said conveyor is of wave-shaped configuration.

3. A conveyor particularly for transporting bulk material, comprising an endless flexible belt having first and second side edges with spaced teeth extending along the length thereof, a first slide fastener engaged with said belt and having means for directing said first and second side edges together to interengage the teeth of said edges and to form a closed conveying tube for the material to be conveyed, a first connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to close belt at its location on the belt as set by the length of said connection member, a second slide fastener engaged with said belt at a spaced location from said first slide fastener having means for directing said first and second side edges apart to disengage the teeth of said edges and to open the closed conveying tube to expose the material being conveyed, a second connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to open said belt at its location on the belt as set by the length of said connecting member, a plurality of carrier rollers located at spaced locations along the path of movement of said conveyor for supporting said flexible belt and a driving chain connected to said belt and being movable to move said belt through a conveying path, said carrier rollers including means for guiding said chain.

4. A conveyor particularly for transporting bulk material comprising an endless flexible belt having first and second side edges with spaced teeth extending along the length thereof, a first slide fastener engaged with said belt and having means for directing said first and second side edges together to interengage the teeth of said edges and to form a closed conveying tube for the material to be conveyed, a first connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to close belt at its location on the belt as set by the length of said connection member, a second slide fastener engaged with said belt at a spaced location from said first slide fastener having means for directing said first and second side edges apart to disengage the teeth of said edges and to open the closed conveying tube to expose the material being conveyed, a second connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to open said belt at its location on the belt as set by the length of said connecting member, a plurality of carrier rollers located at spaced locations along the path of movement of said conveyor for supporting said flexible belt and a driving chain connected to said belt and being movable to move said belt through a conveying path, said carrier rollers including means for guiding said chain, reversing sprocket and roller means for said chain and said conveyor at each end over which said chain and said conveyor are directed, said conveyor having a carrying run portion and a return run portion below said carrying run portion, and means for feeding material to be conveyed onto said conveyor at a location before said first slide fastener of said carrying run portion, said first slide fastener being positioned to close said conveyor over the material before the material is moved through a vertical path.

5. A conveyor according to claim 4, including a third fastener engaged with the portion of said conveyor belt traveling along said return run for directing said first and second side edges together to form a closed conveying tube during the return run, and a fourth slide fastener engaged with the portion of said conveyor belt of said return run at a location spaced from said third slide fastener having means for directing first and second side edges apart to open the closed conveying tube, said first and second slide fasteners being located on said carrier run.

6. A conveyor according to claim 4, including a plurality of spaced supporting walls extending outwardly from the surface of said conveyor belt.

7. A conveyor particularly for transporting bulk material comprising an endless flexible belt having first and second side edges with spaced teeth extending along the length thereof, a first slide fastener engaged with said belt and having means for directing said first and second side edges together to interengage the teeth of said edges and to form a closed conveying tube for the material to be conveyed, a first connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to close belt at its location on the belt as set by the length of said connection member, a second slide fastener engaged with said belt at a spaced location from said first slide fastener having means for directing said first and second side edges apart to disengage the teeth of said edges and to open the closed conveying tube to expose the material being conveyed, a second connecting member connected to said slide fastener and extending in a direction opposite to the direction of movement of said belt and secured to said fixed anchoring means, said first connecting member permitting said slide fastener to move upwardly and downwardly with said belt but preventing movement therewith in the direction of belt travel to cause said slide fastener to open said belt at its location on the belt as set by the length of said connecting member, a plurality of carrier rollers located at spaced locations along the path of movement of said conveyor for supporting said flexible belt, and a driving chain connected to said belt and being movable to move said belt through a conveying path, said carrier rollers including means for guiding said chain, guiding rollers and sprocket means at each end of said conveyor forming said conveyor into a carrier run and a return run below said carrier run, said return run including means for returning said conveyor belt in a flattened non-tubular condition.

References Cited
UNITED STATES PATENTS 2,199,935 5/1940 Johns.

FOREIGN PATENTS 728,901 4/1955 Great Britain.

EVON C. BLUNK, *Primary Examiner.*

A. C. HODGSON, *Assistant Examiner.*